June 1, 1954

V. I. MONCRIEFF 2,679,726

GAS TURBINE POWER PLANT

Filed March 27, 1952

INVENTOR
VEON I. MONCRIEFF

BY Charles A. Warren

ATTORNEY

INVENTOR
VEON I. MONCRIEFF
BY Charles Allassen
ATTORNEY

Patented June 1, 1954

2,679,726

UNITED STATES PATENT OFFICE 2,679,726

GAS TURBINE POWER PLANT

Veon I. Moncrieff, West Hartford, Conn., assignor to United Aircraft Corporation, East Hartford, Conn., a corporation of Delaware Application March 27, 1952, Serial No. 278,770

10 Claims. (Cl. 60—35.6)

The present invention relates to a gas turbine power plant in which a substantial part of the air compressed by the compressor is burned in an auxiliary combustion chamber and discharged directly through an auxiliary thrust nozzle.

In many gas turbine power plants, particularly for use in aircraft, the output of the compressor is carefully balanced against the quantity of gas that can be used by the turbine in order that both the compressor and turbine may operate at maximum efficiency at the design speed of the power plant. With this arrangement the amount of fuel used by the combustion chamber is such that a substantial amount of excess oxygen remains in the gas as it goes through the turbine. It is impossible to burn more fuel without raising the temperature of the products of combustion beyond that at which the turbine can operate safely.

For the purpose of increasing the power output of this type of power plant, as for example for take-off conditions, the power plant has been arranged to burn additional fuel in the turbine exhaust, thereby producing additional thrust. This so-called afterburning is not efficient and is utilized only under conditions where the specific fuel consumption of the power plant is not important.

A feature of the present invention is a rearrangement of the power plant such that additional thrust may be obtained throughout the entire range of operation of the power plant without encountering the inefficient combustion resulting in the afterburner.

Another feature of the invention is a power plant in which the compressor is designed to produce a substantial amount more of compressed air than can be utilized by the turbine with this excess air being delivered through an auxiliary combustion chamber where combustion may take place in the fuel mixture which may be as rich as stoichiometric and with no added air for cooling and with the combustion chamber discharging directly through a thrust nozzle. It will be understood that since the auxiliary combustion chamber and auxiliary nozzle do not involve any movable parts, they can be made of suitable materials or lined with suitable materials to withstand the temperatures resulting from the combustion of the stoichiometric mixture.

A feature of the invention is an arrangement by which to meter fuel to the auxiliary combustion chamber such that the resulting mixture will be substantially stoichiometric at all times.

It is well known that the turbine in a gas turbine power plant will develop more power than is required to drive the compressor, as illustrated for example in the prop-jet type of turbine. A feature of the present invention is the use of the turbine with its excess of power for driving a larger than required compressor and the utilization of the excess of air through a separate propulsive system which is designed to utilize the excess air under most favorable conditions.

Other objects and advantages will be apparent from the specification and claims, and from the accompanying drawings which illustrate an embodiment of the invention.

Figure 1:
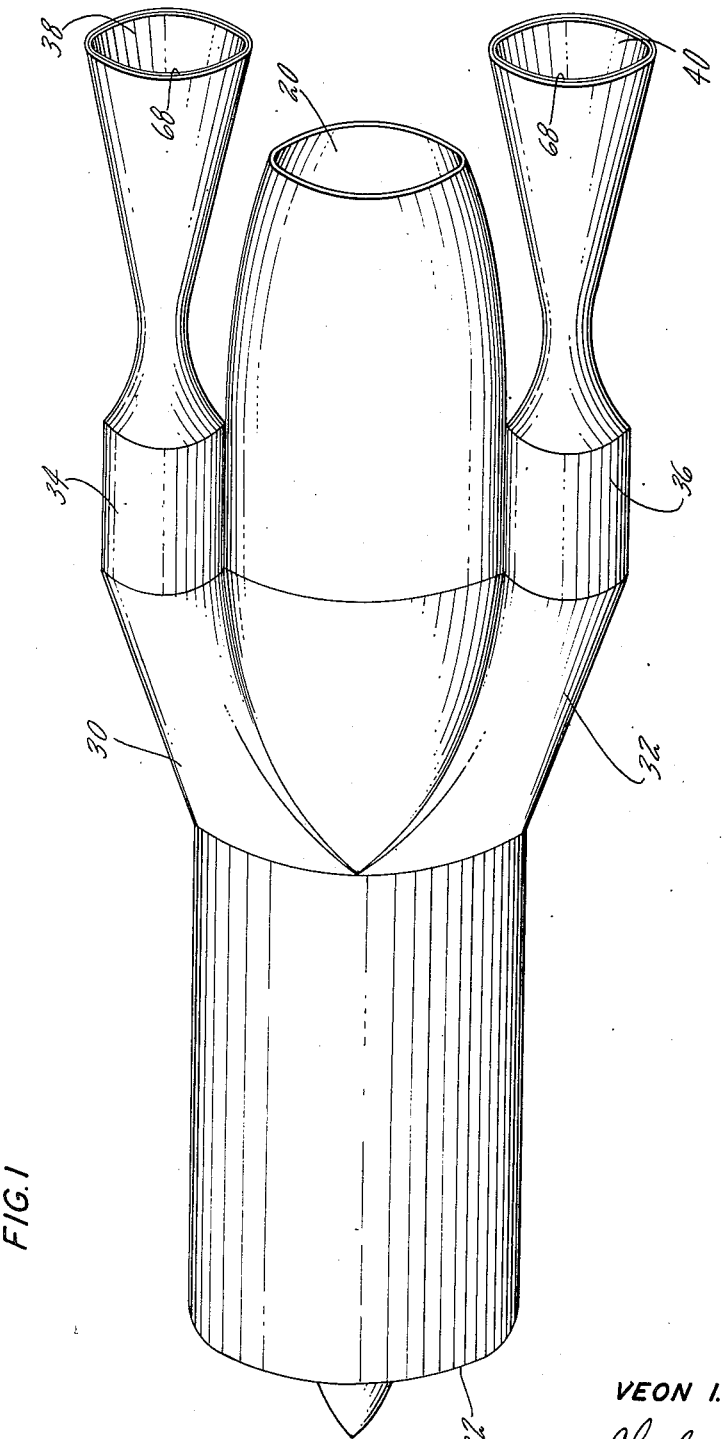
Fig. 1 is a perspective view of the power plant.

The invention is shown in a gas turbine power plant of the split compressor type in which a low pressure compressor 2 driven by a low pressure turbine 4 supplies air to a high pressure compressor 6 the discharge end of which communicates with a combustor 8 to which fuel is supplied from a manifold 10 to nozzles 12. The high pressure compressor is driven from the high pressure turbine 14 located at the discharge end of the combustor. In the arrangement shown the outer spool including the high pressure compressor, high pressure turbine and interconnecting drive sleeve 16 rotates independently of the inner spool which is made up of the low pressure compressor 2, the low pressure turbine 4 and the interconnecting shaft 18. Gas from the low pressure turbine is discharged through a thrust nozzle 20. It will be understood that the low pressure compressor has an air inlet 22 which in the normal installation of the power plant in aircraft is directed forwardly of the aircraft to take advantage of the ram effect.

In accordance with the invention, the capacities of the low pressure and high pressure compressors 2 and 6, instead of being matched to the turbines 14 and 4, are made substantially larger than is required by the turbines to such an extent that a substantial portion of the compressed air from the compressors may be utilized by some other means than by the turbines. As shown, the annular path 24 through which the gas from the high pressure compressor is delivered is divided as by a cylindrical shield 26 to form separate flow paths 24a around the shield and 24b within the shield. The path 24b communicates with the combustor as will be apparent through a diffuser member 28.

The outer path 24a almost immediately downstream of the end of the compressor becomes two semi-circular paths 30 and 32 which gradually diverge and become two independent cylindrical ducts 34 and 36 which constitute auxiliary combustion chambers in which the excess of air from the compressor is mixed with fuel for combustion. The downstream end of these auxiliary combustion chambers are connected to thrust nozzles 38 and 40 as shown, which by reason of the existing pressures in the auxiliary chambers will preferably be supersonic nozzles in order to develop the greatest possible thrust.

During operation of the power plant at design speed the flow through the supersonic nozzles will be substantially constant and these nozzles can therefore be designed for the flow that occurs at design speed.

Figure 2:
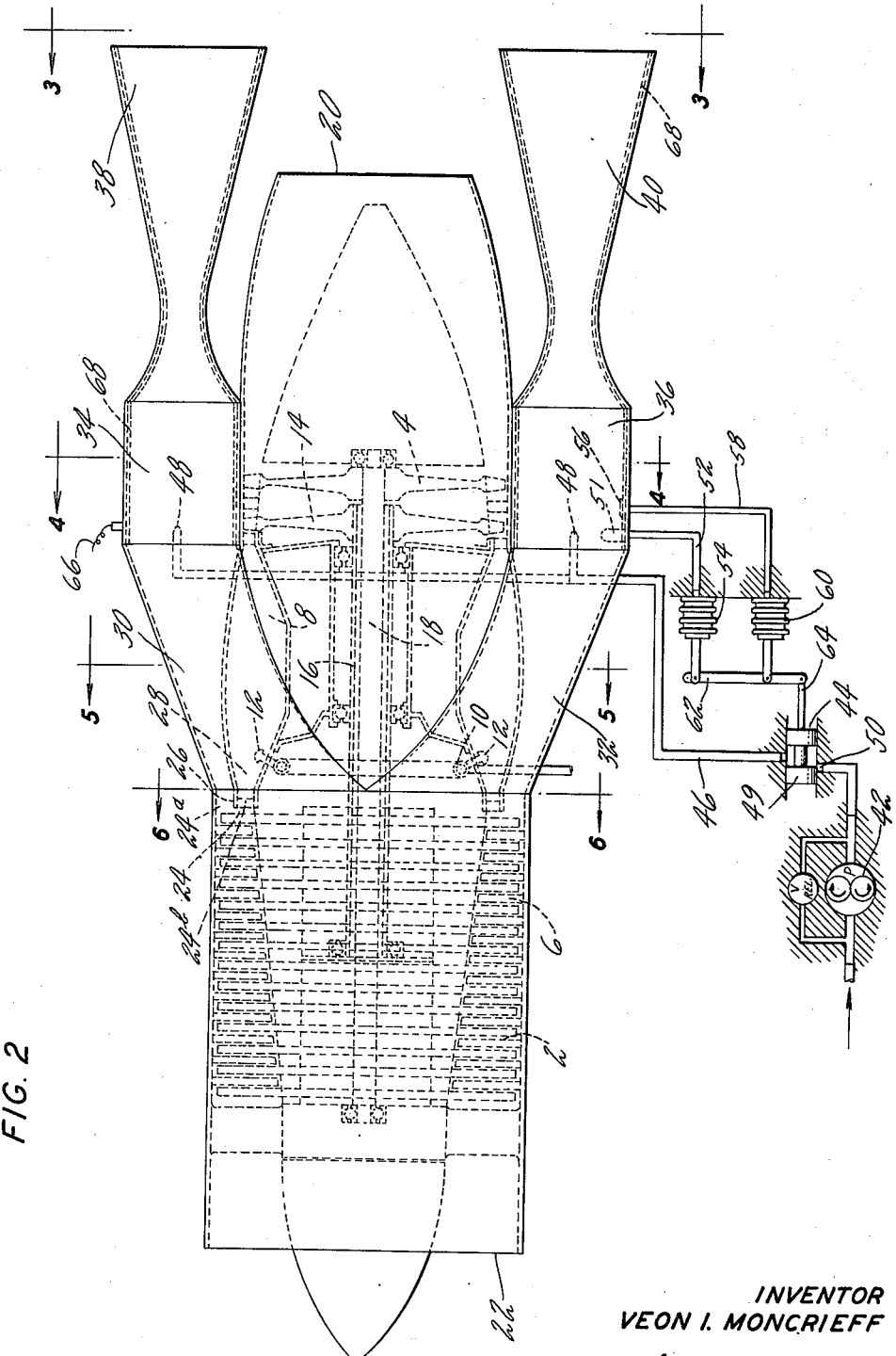
Fig. 2 is an elevational view of the power plant, with a diagrammatic fuel control for a part of the power plant.
Figure 3:
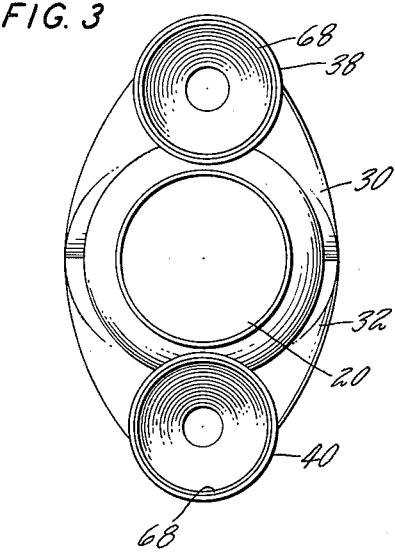
Fig. 3 is a sectional view substantially along the line 3—3 of Fig. 2.
Figure 4:
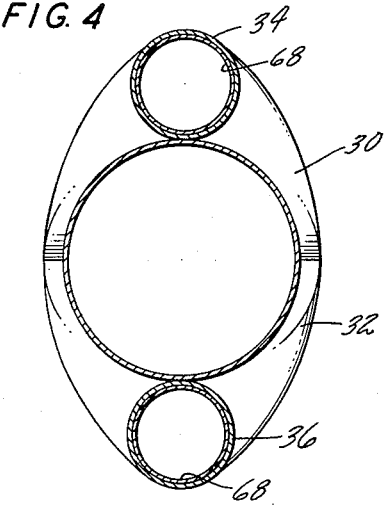
Fig. 4 is a sectional view substantially along the line 4—4 of Fig. 2.
Figure 5:
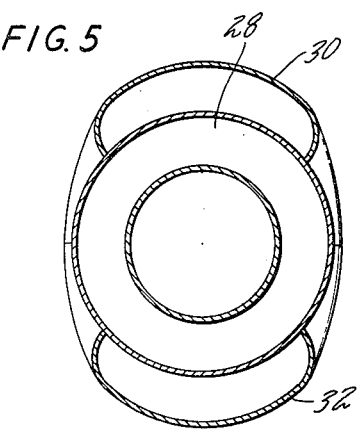
Fig. 5 is a sectional view substantially along line 5—5 of Fig. 2.
Figure 6:
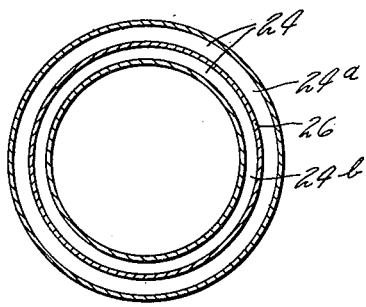
Fig. 6 is a sectional view substantially along line 6—6 of Fig. 2.

For the purpose of developing as much thrust as possible it is advantageous to produce a stoichiometric mixture of fuel and air in the auxiliary combustion chambers. One arrangement for doing this is to vary the fuel flow through the chambers as a function of the density of the air within the chambers. As shown in Fig. 2, the fuel under pressure for the auxliary chambers may be supplied from a pump 42 to a control valve 44 and thence through conduit 46 to the fuel nozzles 48 in the chambers. The valve 44 has a movable element 49 which more or less closes an inlet port 50 communicating with the pump.

The movable element 49 is movable as a function of the temperature and pressure of the air within the auxiliary combustion chamber. The temperature is measured by a temperature sensing device including a probe 51 located in the chamber and connected by a conduit 52 to a bellows 54. A pressure tap 56 in the wall of the combustion chamber is connected by a conduit 58 to a bellows 60. The bellows 54 and 60 are interconnected by a lever 62 which in turn is connected to a projecting rod 64 on the valve element 49. With the lever 62 connected as shown, an increase in temperature in the combustion chamber will result in a movement of the valve element 49 to reduce the flow area through port 50 and an increase in pressure in the combustion chamber will tend to open the port for increasing the flow area. The fuel and air mixture may be ignited by any suitable ignitor 66.

With combustion occurring in the auxiliary combustion chamber at the high temperature resulting from a stoichiometric mixture it is advantageous to insulate the walls of the chamber as well as the walls of the nozzle. This may be accomplished by lining the chamber, if the latter has a metallic wall, with a ceramic lining 68 which may be made from certain of the alumina or zirconia materials which have been found to be especially heat resistent or, alternatively, certain of the carbides could be untilized as liners.

As an alternative, the entire auxiliary combustion chamber and the auxiliary thrust nozzle could be made of some of these ceramics which have now been developed to such an extent as to be strong enough to withstand the pressures that will develop within the auxiliary combustion chamber.

It is to be understood that the invention is not limited to the specific embodiment herein illustrated and described, but may be used in other ways without departure from its spirit as defined by the following claims.

I claim:

1. A gas turbine power plant including a turbine, a combustion chamber, a compressor driven by said turbine for supplying air to said combustion chamber, said compressor being dimensioned to provide a substantial excess of air over that required for driving the turbine, an auxiliary combustion chamber connected to the compressor and into which a part of the air from the compressor is discharged, fuel supply means for said auxiliary combustion chamber, an auxiliary thrust nozzle for said auxiliary combustion chamber through which the products of combustion from said chamber are discharged, said auxiliary combustion chamber and said auxiliary nozzle having a heat resistant lining, and means responsive to the density of the air in said auxiliary combustion chamber for controlling the quantity of the fuel being supplied to said auxiliary combustion chamber to produce a stoichiometric mixture.

2. A gas turbine power plant including a turbine, a combustion chamber, a compressor driven by said turbine for supplying air to said combustion chamber, said compressor being dimensioned to provide a substantial excess of air over that required for driving the turbine, an auxiliary combustion chamber connected to the discharge end of the compressor and into which a part of the air from the compressor is discharged, fuel supply means for said auxiliary combustion chamber and an auxiliary thrust nozzle for said auxiliary combustion chamber through which the products of combustion from said chamber are discharged, said auxiliary combustion chamber and said auxiliary nozzle having a heat resistant lining, and means responsive to the density of the air in said auxiliary combustion chamber for controlling the quantity of the fuel being supplied to said auxiliary combustion chamber to produce a stoichiometric mixture.

3. A gas turbine power plant including a turbine, a combustion chamber, a compressor driven by said turbine for supplying air to said combustion chamber, said compressor being dimensioned to provide a substantial excess of air over that required for driving the turbine, an auxiliary combustion chamber connected to the compressor and into which a part of the air from the compressor is discharged, fuel supply means for said auxiliary combustion chamber, means responsive to the pressure and temperature of the air in said auxiliary combustion chamber for adjusting the fuel supply as a function of the density of the air and an auxiliary thrust nozzle connected to the discharge end of the auxiliary combustion chamber for discharge of the products of combustion from said chamber at low pressure.

4. A gas turbine power plant including a turbine, a combustion chamber, a compressor driven by said turbine for supplying air to said combustion chamber, said compressor being dimensioned to provide a substantial excess of air over that required for driving the turbine, an auxiliary combustion chamber connected to the discharge end of the compressor and into which a part of the air from the compressor is discharged, fuel supply means for said auxiliary combustion chamber, valve means for controlling said fuel supply, means responsive to the pressure and temperature of the air in said auxiliary combustion chamber for adjusting said valve means as a function of the density of the air in said chamber, and an auxiliary thrust nozzle connected to the discharge end of the auxiliary combustion chamber.

5. A gas turbine power plant including a turbine, a combustion chamber, a compressor driven by said turbine for supplying air to said combustion chamber, said compressor being dimensioned to provide a substantial excess of air over that required for driving the turbine, means for dividing the compressed air discharged from the compressor with one part of the air delivered directly to said combustion chamber a connection from said combustion chamber to the turbine for the discharge of the products of combustion from said chamber through said turbine, an auxiliary chamber through which another part of the compressed air is discharged, an auxiliary thrust nozzle connected directly to said auxiliary combustion chamber for the discharge of gas from the auxiliary chamber through the nozzle, means for supplying fuel to said auxiliary chamber and means associated with said fuel supply and responsive to the density of the air in said auxiliary chamber to vary the fuel flow to produce substantially a stoichiometric mixture.

6. A gas turbine power plant including a turbine, a combustion chamber, a compressor driven by said turbine for supplying air to said combustion chamber, said compressor being dimensioned to provide a substantial excess of air over that required for driving the turbine, means for dividing the compressed air discharged from the compressor with one part of the air delivered directly to said combustion chamber a connection from said combustion chamber to the turbine for the discharge of the products of combustion from said chamber through said turbine, an auxiliary chamber through which another part of the compressed air is discharged, an auxiliary thrust nozzle connected directly to said auxiliary combustion chamber for the discharge of gas from the auxiliary chamber through the nozzle, means for measuring the density of the air entering the auxiliary combustion chamber, means for supplying fuel to said auxiliary chamber and means responsive to variations in the density of the air entering the chamber for varying the fuel flow to said auxiliary chamber.

7. A gas turbine power plant including a turbine, a combustion chamber delivering gas to the turbine, a compressor driven by said turbine for supplying air to said combustion chamber, said compressor being dimensioned to provide a substantial excess of air over that required for driving the turbine, means for dividing the compressed air discharged from the compressor such that the portion required for the turbine is delivered directly to the combustion chamber, a pair of auxiliary combustion chambers to each of which a part of the excess of air is delivered, said auxiliary chambers being located in laterally spaced relation to the main combustion chamber, means for supplying fuel to said auxiliary chambers means responsive to the density of the air entering said auxiliary chambers for controlling the supply of fuel to said auxiliary chambers as a function of the density of the air such that the mixture of fuel and air in said chambers will be substantially a stoichiometric mixture, and auxiliary thrust nozzles connected to said auxiliary chambers through which the products of combustion from said chambers are discharged.

8. A gas turbine power plant including a turbine, a combustion chamber delivering gas to the turbine, a compressor driven by said turbine for supplying air to said combustion chamber, said compressor being dimensioned to provide a substantial excess of air over that required for driving the turbine, means for dividing the compressed air discharged from the compressor such that the portion required for the turbine is delivered directly to the combustion chamber, a pair of auxiliary combustion chambers to each of which a part of the excess of air is delivered, said auxiliary chambers being located in laterally spaced relation to the main combustion chamber, means for supplying fuel to said auxiliary chambers means responsive to the density of the air entering said auxiliary chambers for controlling the supply of fuel to said auxiliary chambers as a function of the density of the air such that the mixture of fuel and air in said chambers will be substantially a stoichiometric mixture, and auxiliary thrust nozzles connected to said auxiliary chambers through which the products of combustion from said chambers are discharged, the inner wall surface of said auxiliary chamber and said auxiliary nozzle being a heat resistant material.

9. A gas turbine power plant including a turbine, a combustion chamber, a compressor driven by said turbine for supplying air to said combustion chamber, said compressor being dimensioned to provide a substantial excess of air over that required for driving the turbine, said compressor having an annular discharge, a cylindrical shield located in said annular discharge to define separate inner and outer flow paths with the inner path connected directly to the inlet end of the combustion chamber, means for dividing the outer annular path into segments, auxiliary combustion chambers located in laterally spaced relation to the main combustion chamber and on opposite sides thereof, ducting from said segments of the outer annular path of the compressor to said auxiliary chambers, means for supplying fuel to said chambers, and auxiliary thrust nozzles for said auxiliary chambers.

10. A gas turbine power plant including a turbine, a combustion chamber delivering gas to the turbine, a compressor driven by said turbine for supplying air to said combustion chamber, said compressor being dimensioned to provide a substantial excess of air over that required for driving the turbine, said compressor having an annular discharge, a cylindrical shield located in said annular discharge to define separate inner and outer flow paths with the inner path connected directly to the inlet end of the combustion chamber, means for dividing the outer annular path into segments, auxiliary combustion chambers located in laterally spaced relation to the main combustion chamber and on opposite sides thereof, ducting from said segments of the outer annular path of the compressor to said auxiliary chambers, means for supplying fuel to said chambers, means responsive to the density of air in the auxiliary combustion chambers for controlling the supply of fuel to said auxiliary chambers as a function of the density of the air therein, and an auxiliary thrust nozzle for each of said auxiliary chambers.

References Cited in the file of this patent

UNITED STATES PATENTS

| Number | Name | Date |
|---|---|---|
| 2,217,649 | Goddard | Oct. 8, 1940 |
| 2,409,177 | Allen et al. | Oct. 15, 1946 |
| 2,499,232 | Strub | Feb. 28, 1950 |
| 2,509,890 | Stalker | May 30, 1950 |
| 2,566,373 | Redding | Sept. 4, 1951 |
| 2,580,591 | Pouit | Jan. 1, 1952 |
| 2,610,465 | Imbert et al. | Sept. 16, 1952 |